(12) United States Patent
Mödinger et al.

(10) Patent No.: US 11,014,531 B2
(45) Date of Patent: May 25, 2021

(54) BELT TIGHTENER

(71) Applicant: TRW Automotive GmbH, Alfdorf (DE)

(72) Inventors: Thomas Mödinger, Alfdorf (DE); Bruno Arbter, Schwäbisch Gmünd (DE); Steffen Seiffert, Aalen (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 82 days.

(21) Appl. No.: 16/332,815

(22) PCT Filed: Sep. 26, 2017

(86) PCT No.: PCT/EP2017/074325
§ 371 (c)(1),
(2) Date: Mar. 13, 2019

(87) PCT Pub. No.: WO2018/060178
PCT Pub. Date: Apr. 5, 2018

(65) Prior Publication Data
US 2019/0210557 A1  Jul. 11, 2019

(30) Foreign Application Priority Data

Sep. 29, 2016  (DE) ..................... 10 2016 118 464.0

(51) Int. Cl.
*B60R 22/28* (2006.01)
*B60R 22/46* (2006.01)

(52) U.S. Cl.
CPC .......... *B60R 22/4628* (2013.01); *B60R 22/46* (2013.01); *B60R 2022/4642* (2013.01); *B60R 2022/4647* (2013.01)

(58) Field of Classification Search
CPC ................ B60R 22/4628; B60R 22/46; B60R 2022/4647; B60R 2022/4642
(Continued)

(56) References Cited

U.S. PATENT DOCUMENTS

| 10,029,647 B2 | 7/2018 | Gentner et al. |
| 2014/0014758 A1* | 1/2014 | Gentner ............. B60R 22/4628 242/389 |

(Continued)

FOREIGN PATENT DOCUMENTS

| WO | 2005080150 | 1/2005 |
| WO | 2015037485 | 3/2015 |

*Primary Examiner* — Toan C To
(74) *Attorney, Agent, or Firm* — Tarolli, Sundheim, Covell & Tummino LLP (57) ABSTRACT

A belt tensioner (10) for a seatbelt system comprises a tensioner tube (20) having an open outlet end and a force transmission element (22) which is guided in the tensioner tube (20) and which leaves the tensioner tube (20) via the open outlet end, a gas generator (18) providing compressed gas for displacing the force transmission element (22) within the tensioner tube (20) as well as a drive wheel (16) rotated by the force transmission element (22) leaving the tensioner tube (20). There is provided a guiding component (24) surrounding the drive wheel (16) into which guiding component the force transmission element (22) enters upon leaving the tensioner tube (20). At the guiding component (24) an energy-dissipating structure (50) is provided which the force transmission element (22) contacts when it has at least substantially completely left the tensioner tube (20).

11 Claims, 4 Drawing Sheets

(58) Field of Classification Search
USPC .......................................................... 280/806
See application file for complete search history.

(56) References Cited

U.S. PATENT DOCUMENTS

| | | |
|---|---|---|
| 2014/0110518 A1* | 4/2014 | Nakayama .......... B60R 22/4633 |
| | | 242/374 |
| 2015/0336538 A1* | 11/2015 | Gray ................... B60R 22/4628 |
| | | 242/389 |
| 2015/0336539 A1 | 11/2015 | Gray et al. |
| 2016/0114762 A1 | 4/2016 | Landbeck et al. |
| 2017/0225651 A1 | 4/2017 | Asako |
| 2019/0322241 A1* | 10/2019 | Mihara ............... B60R 22/4628 |
| 2020/0231115 A1* | 7/2020 | Tanaka .................... B60R 22/46 |

* cited by examiner

BELT TIGHTENER

RELATED APPLICATIONS

This application corresponds to PCT/EP2017/074325, filed Sep. 26, 2017, which claims the benefit of German Application No. 10 2016 118 464.0, filed Sep. 29, 2016, the subject matter of which are incorporated herein by reference in their entirety.

BACKGROUND OF THE INVENTION

The invention relates to a pyrotechnically driven belt tensioner for a seatbelt system.

A belt tensioner serves for reducing certain influences which are affecting restraint of the vehicle occupant, before the forward displacement of the vehicle occupant and, where appropriate, the use of a force limiter will start. Said influences include the so-called film-reel effect (belt webbing loosely wound onto the belt reel) and the belt slack (belt webbing being loosely adjacent to the vehicle occupant). The belt tensioner reduces the belt slack and the film reel effect within a split second by e.g. winding webbing onto a belt reel of a belt retractor and in this way tensioning the belt webbing. The vehicle occupant thus may take part in the vehicle deceleration at an early stage. Moreover, the conditions for subsequent use of a force limiter will improve.

Usually today pyrotechnically driven belt tensioners are in use so that the high forces required for belt tensioning can be provided within a sufficiently short time.

In a known configuration of a belt tensioner a force transmission element is provided which is displaced by the gas pressure generated by a gas generator in a tensioner tube when the belt tensioner is activated. The force transmission element interacts with the belt reel and rotates the latter so as to tension the belt.

SUMMARY OF THE INVENTION

It is the object of the invention to check the movement of the force transmission element in a belt tensioner of the afore-mentioned type, especially after it has driven the belt reel.

This object is achieved by the features of claim 1. According to the invention, a belt tensioner for a seatbelt system includes a tensioner tube comprising an open outlet end and a force transmission element which is guided in the tensioner tube and leaves the tensioner tube via the open outlet end. Moreover, a gas generator which provides compressed gas for displacing the force transmission element within the tensioner tube as well as a drive wheel rotated by the force transmission element leaving the tensioner tube are part of the belt tensioner. The force transmission element enters into a guiding component surrounding the drive wheel as soon as it leaves the tensioner tube, wherein an energy-dissipating structure with which the force transmission element enters into contact when it has at least substantially completely left the tensioner tube is provided at the guiding component.

The force transmission element interacts with the drive wheel preferably directly after leaving the tensioner tube in a predetermined engaging area so as to transmit as high kinetic energy as possible to the belt reel. The energy-dissipating structure reduces the kinetic energy of the force transmission element in a defined reproducible way, when the latter interacts with the drive wheel and has transmitted part of its kinetic energy to the latter. The energy-dissipating structure therefore ensures the force transmission element to move in strictly predefined areas after leaving the tensioner tube and especially not to repeatedly engage in the drive wheel so that the force level of force limitation which follows the belt tensioning is clearly defined.

Advantageously, the energy-dissipating structure stops the force transmission element, wherein the force transmission element is brought preferably completely to a halt. This is effectuated e.g. in an area of the periphery of the drive wheel in which the force transmission element cannot enter into contact with the engaging area and with the drive wheel.

In order to protect the drive wheel from contacting the force transmission element outside the engaging area, the guiding component according to a preferred embodiment includes a radially inner circumferential wall extending over a major part of the periphery of the drive wheel, especially approx. over 200° to 270°, which surrounds the drive wheel and which prevents the force transmission element from contacting the drive wheel.

The guiding component may include a guiding groove for the force transmission element which is formed by the inner circumferential wall as well as by two portions of the guiding component extending radially outwardly from the axial ends of the circumferential wall.

In the engaging area which may comprise about 90 to 160°, the radially inner circumferential wall is preferably omitted so that the force transmission element leaving the tensioner tube may interact with the drive wheel and may drive the drive wheel.

The force transmission element may be formed integrally or may consist of plural separate parts, for example a number of balls which possibly may even be coupled to each other. The functional principle of the belt tensioner as well as the benefit of an intermediate element positively coupled to the stop element are equal in all cases.

When a one-piece force transmission element is used, the latter may be, for example, an elongate flexible elastically and/or plastically deformable plastic component.

In this case, in a preferred embodiment, the force transmission element includes in the area of a rear end a tapered segment having a diameter reduced vis-à-vis a front segment, wherein interaction with the drive wheel is reduced when the tapered segment passes the drive wheel. The rear end is the end of the force transmission element located at the rear in the direction of movement. Thus, the tapered segment arrives at the engaging area of the drive wheel only late in the course of belt tensioning. As an interaction with the drive wheel is reduced at this instant, the kinetic energy of the force transmission element remains higher and the force transmission element moves completely out of the tensioner tube. Thus, the drive wheel and, consequently, the belt reel are ensured to be released for subsequent force limitation.

The tapered segment may be located ahead of an actual final segment of the force transmission element. This final segment is preferably subdivided via predetermined breaking points into plural, especially two or four parts which are separated from the remainder of the force transmission element when leaving the tensioner tube at the latest. This feature, too, helps to ensure that the force transmission element completely leaves the tensioner tube and the interaction of the force transmission element with the drive wheel is reduced as far as possible after belt tensioning is terminated so as to allow a defined force level for subsequent force limitation.

The energy-dissipating structure is preferably arranged in the direction of movement of the force transmission element at an as large distance as possible from the open outlet end of the tensioner tube so that an elongate force transmission element may completely leave the tensioner tube before it is stopped by the energy-dissipating structure at its front end.

When viewed in the direction of rotation of the drive wheel (corresponding to the direction of movement of the force transmission element), the energy-dissipating structure may be arranged at a distance e.g. by an angle of about 235° to 345° from the open outlet end of the tensioner tube. This corresponds approximately to the end of the normal travel path of the force transmission element in which the force transmission element has completely passed the engaging area.

The radially inner wall may end at the energy-dissipating structure, when viewed in the direction of rotation of the drive wheel, while it preferably starts directly behind the engaging portion.

Of preference, the engaging portion extends starting from the open outlet end of the tensioner tube not only in the direction of rotation of the drive wheel but also against the direction of rotation of the drive wheel by a certain distance, e.g. about 30 to 60°. This offers the possibility of removing, at the beginning of force limitation during which the belt reel and thus the drive wheel rotate against the direction of rotation during belt tensioning, possible remainders of the force transmission element which are still in mesh with the drive wheel from the same by rotation in the opposite direction without entering into disturbing contact with the radially inner circumferential wall and/or the energy-dissipating structure.

The energy-dissipating structure may be formed, for example, at a radially outer circumferential wall of the guiding component which extends over a small part of the outer periphery of the guiding component only, especially over approx. 10 to 45°. Said radially outer circumferential wall preferably comprises merely the energy-dissipating structure. Said circumferential wall also prevents the force transmission element from evading radially outwardly. Moreover, the circumferential wall increases friction between the force transmission element and the guiding component, which equally contributes to the dissipation of energy.

Preferably, the energy-dissipating structure comprises at least one cutting edge for engaging in the force transmission element. The cutting edge digs itself into the force transmission element when the latter abuts against the energy-dissipating structure and thus can simultaneously dissipate kinetic energy and hold the force transmission element at the energy-dissipating structure.

The energy-dissipating structure may comprise, for example, two cutting edges arranged in V-shape, wherein the V opens against the direction of movement of the force transmission element. A front end of the force transmission element is pushed into the energy-dissipating structure, and further movement beyond the energy-dissipating structure to repeatedly contact the drive wheel is safely prevented.

The energy-dissipating structure may also comprise a land extending in parallel to a shaft of the drive wheel and connecting especially the two cutting edges. Said land then is preferably part of the radially outer circumferential wall.

The part of the engaging portion located at the rear in the direction of rotation preferably begins directly adjacent to the energy-dissipating structure. In this way, the force transmission element obtains the longest possible travel path, which in a one-piece force transmission element enables the maximum possible constructional length to be provided for the force transmission element.

The guiding component may be open in portions along its outer periphery, preferably apart from the radially outer peripheral wall, for example. By this design separated parts of the force transmission element can leave the guiding component. Said parts are collected in the belt retractor frame distant from the drive wheel and thus free the space around the drive wheel.

BRIEF DESCRIPTION OF THE DRAWINGS

Hereinafter the invention will be illustrated by way of an example configuration with reference to the enclosed drawings, wherein.

DESCRIPTION

Figure 1:
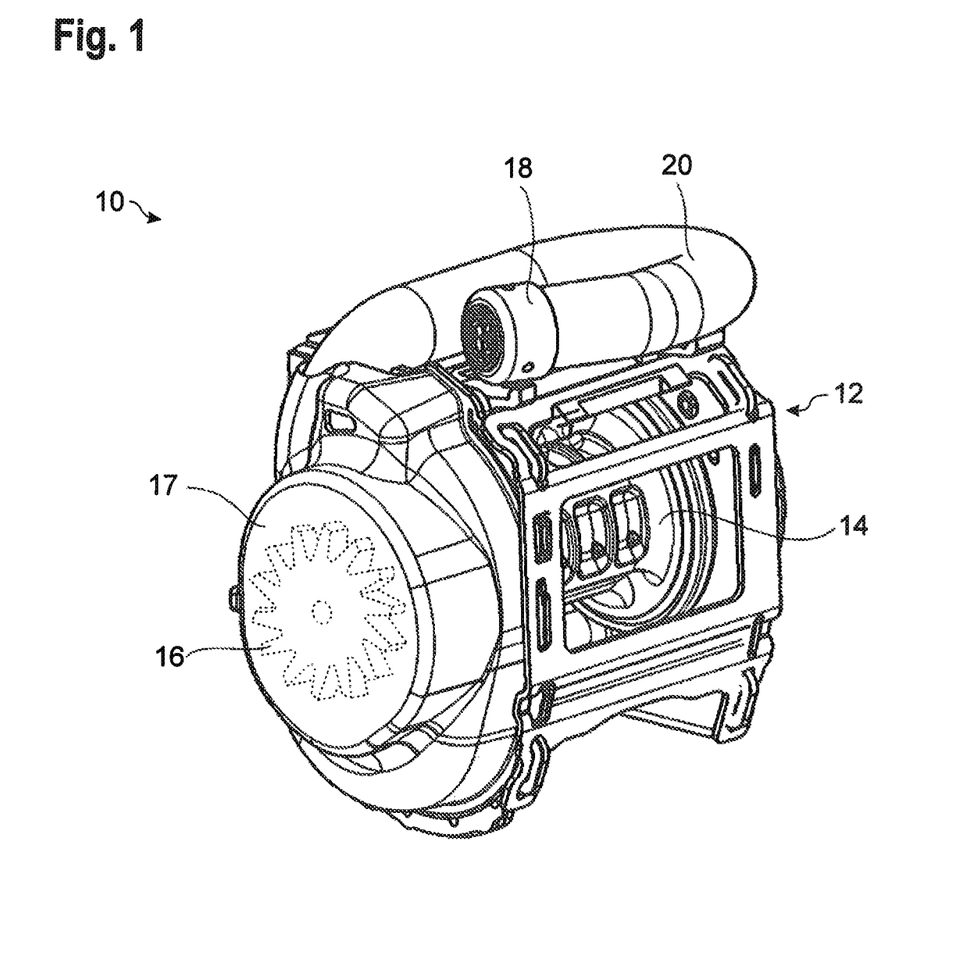
FIG. 1 shows a schematic perspective representation of a belt tensioner according to the invention, being integrated in a belt retractor.

The figures illustrate the essential parts of a belt retractor comprising a pyrotechnically driven belt tensioner 10 integrated in the same. In a retractor frame 12 of the belt retractor a belt reel 14 onto which belt webbing can be wound and from which belt webbing can be extracted is rotatably supported (not shown here). At one end of the spindle of the belt reel 14, at the left-side end in FIG. 1, a drive wheel 16 is provided (indicated by broken lines in FIG. 1) which is arranged concentrically to the spindle of the belt reel 14 and which in FIG. 1 is covered by a cover 17 of the belt tensioner 10. The drive wheel 16 includes an external toothing and serves for rotating the belt reel 14 via the belt tensioner 10.

The belt tensioner 10 includes a gas generator 18 arranged at one end of a tensioner tube 20 so that generated compressed gas may flow into the tensioner tube 20. In the tensioner tube 20 a force transmission element 22 is movably arranged (cf. also FIG. 8) which is basically accelerated by the gas generated by the gas generator 18, leaves the tensioner tube 20 through an open outlet end of the tensioner tube 20 and interacts in an engaging area 26 with the drive wheel 16 so that the drive wheel 16 is rotated by squeezing past the force transmission element 22. In the engaging area 26 the external toothing of the drive wheel 16 is accessible to the force transmission element 22 leaving the tensioner tube 20.

Figures 4, 5, 6:
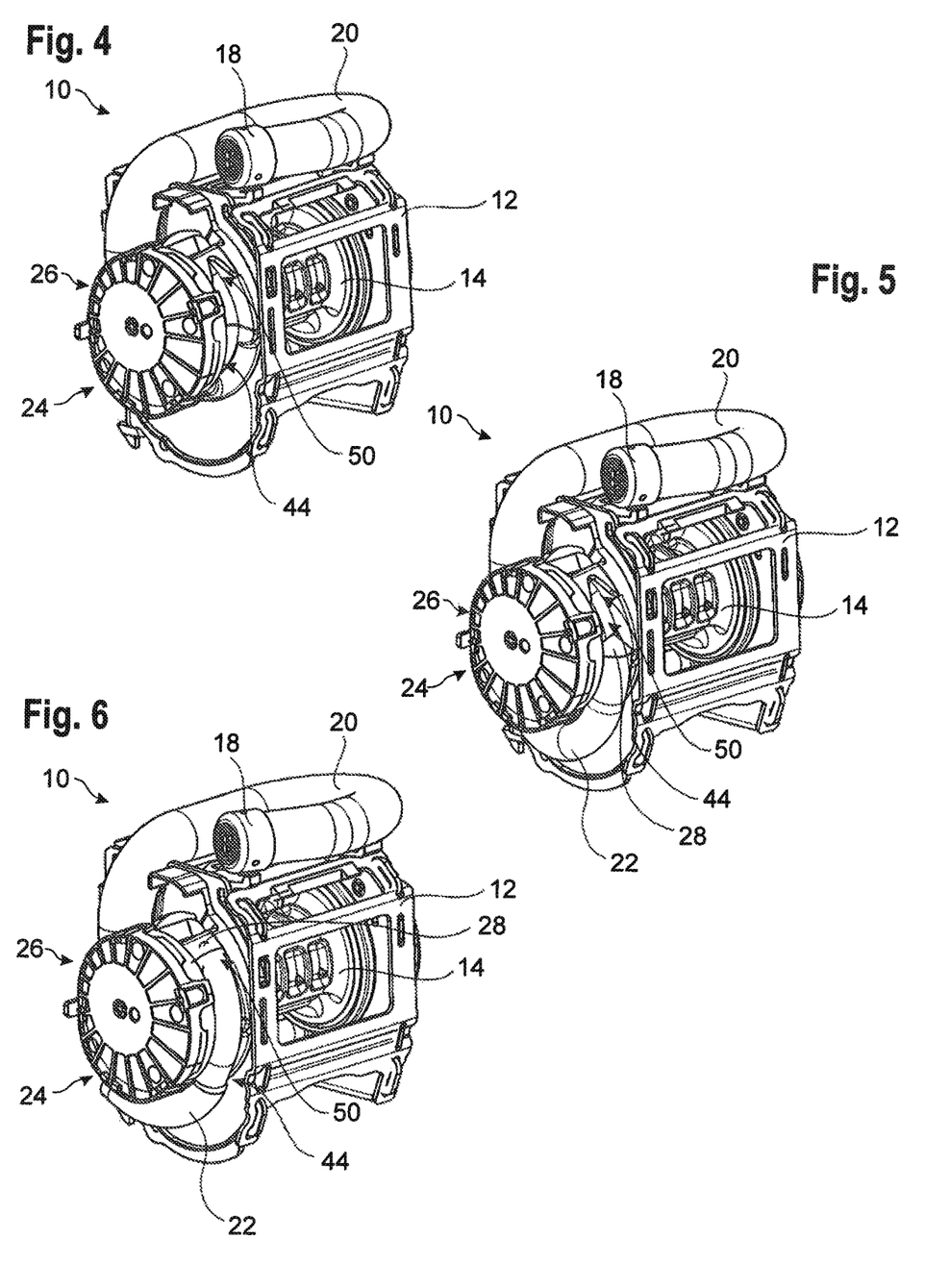
FIGS. 4 to 6 show schematic perspective representations of the assembly from FIG. 3 before, during and after the guiding component has left the tensioner tube.

The engaging area 26 is located directly at the open outlet end of the tensioner tube 20 so that the force transmission element 22 impacts on the drive wheel 16 with as high kinetic energy as possible (cf. FIG. 5).

The belt tensioner 10 moreover includes a force limiter which is not shown in detail here.

The direction of movement B of the force transmission element 22 is predetermined first by the shape of the tensioner tube 20 and then largely by a guiding component 24 discussed in detail later which is arranged beneath the cover 17 of the belt tensioner 10. The tensioner tube 20 is partially strongly curved in plural spatial directions so that the direction of movement of the force transmission element 22 is not linear.

The force transmission element 22 includes, when viewed in the direction of movement, a front end 28 and a rear end 30.

Figure 8:
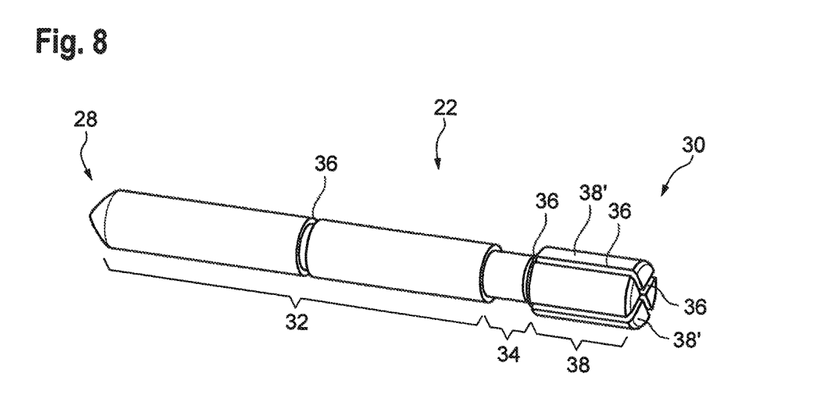
FIG. 8 shows a schematic perspective representation of a force transmission element of the belt tensioner according to the invention.

FIG. 8 shows a possible configuration of the force transmission element 22.

The force transmission element 22 in this case is an integral elongate component completely made from plastic material which is so flexible that it may follow the curvature of the tensioner tube 20 and is preferably plastically deformable so far that the drive wheel 16 may squeeze itself into the force transmission element 22 and in this way may provide a working structure which contributes to producing proper force transmission between the force transmission element 22 and the drive wheel 16, while the force transmission element 22 is pushed past the drive wheel 16.

In this example, the force transmission element 22 is subdivided into plural segments. A front segment 32 extends from the front end 28 to the beginning of a tapered segment 34 having a reduced diameter vis-à-vis the front segment 32.

The front segment 32 may be subdivided once again by one or more constrictions 36 in which the diameter is reduced over a short distance.

The tapered segment 34 is followed by a final segment 38 which in this case has a larger diameter than the front segment 32, with the diameter still being selected so that the force transmission element 22 may slide within the tensioner tube 20 without high friction losses, however.

The final segment 38 is subdivided into four portions by constrictions 36 in parallel to the direction of movement. In said constrictions the material of the final segment 38 may also be completely severed.

All constrictions 36 constitute predetermined breaking points at which the force transmission element 22 may break apart after passing the drive wheel 16. In the case of the constrictions 36 in the final segment 38, this may also happen already upon leaving the tensioner tube 20, wherein the final segment 38 need not necessarily contribute to the force transmission to the drive wheel 16.

Due to said subdivision of the elongate force transmission element 22 into shorter segments, the individual portions of the force transmission element 22 can move more easily away from the drive wheel 16 after having passed the latter and can collect in an area of the retractor frame 12 distant from the drive wheel 16, where they do not obstruct rotation of the drive wheel 16 in the case of force limitation following belt tensioning.

The tapered segment 34 helps the force transmission element 22 to move completely past the drive wheel 16. Since said segment is arranged close to the rear end 30, it reaches the drive wheel 16 only late in the course of belt tensioning, when a major part of the force transmission element 22 has already left the tensioner tube 20. By reducing the diameter lower forces are acting between the force transmission element 22 and the drive wheel 16 than in the area of the front segment 32 so that the kinetic energy of the force transmission element 22 is less strongly reduced. As a consequence, the force transmission element 22 is ensured, during proper use, to continue moving in the direction of movement past the drive wheel 16 and thus to remove itself from the drive wheel and to release the same before force limitation will start.

The guiding component 24 surrounds the drive wheel 16 and is arranged below the cover 17. The guiding component 24 is shown separately in FIG. 2. In this example, the guiding component 24 is a plastic component to be fabricated in one piece which is attached with a central recess to the drive wheel 16 so that the latter may rotate within the same. The guiding component 24 is tightly connected to the retractor frame 12 and does not co-rotate with the drive wheel 16 or the belt reel 14.

Figure 3:
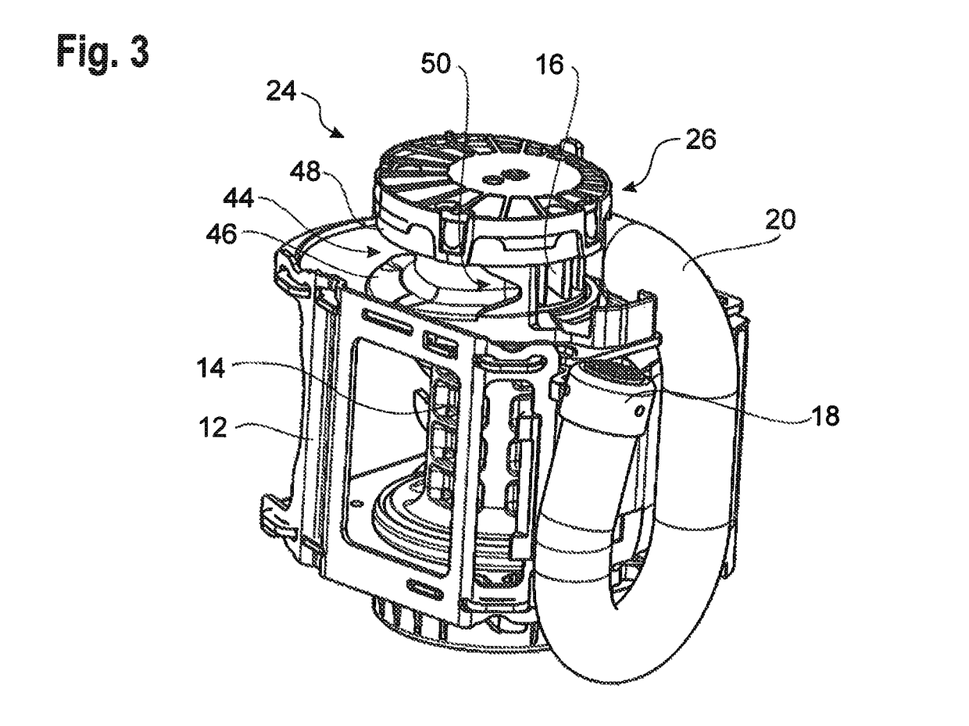
FIG. 3 shows a schematic representation of components of the belt retractor and the belt tensioner from FIG. 1, before the force transmission element leaves the tensioner tube.

FIG. 3 illustrates the assembly from FIG. 1 without the cover 17 so that the guiding component 24 is visible.

The guiding component 24 has a radially inner circumferential wall 42 which is arranged concentrically around the drive wheel 16 and which, in this example, extends completely closed over a major part of the periphery of the drive wheel 16. The radially inner circumferential wall 42 in this case leaves open merely the engaging area 26 (in FIG. 2 on the rear side of the guiding component 24, not shown).

Figure 2:
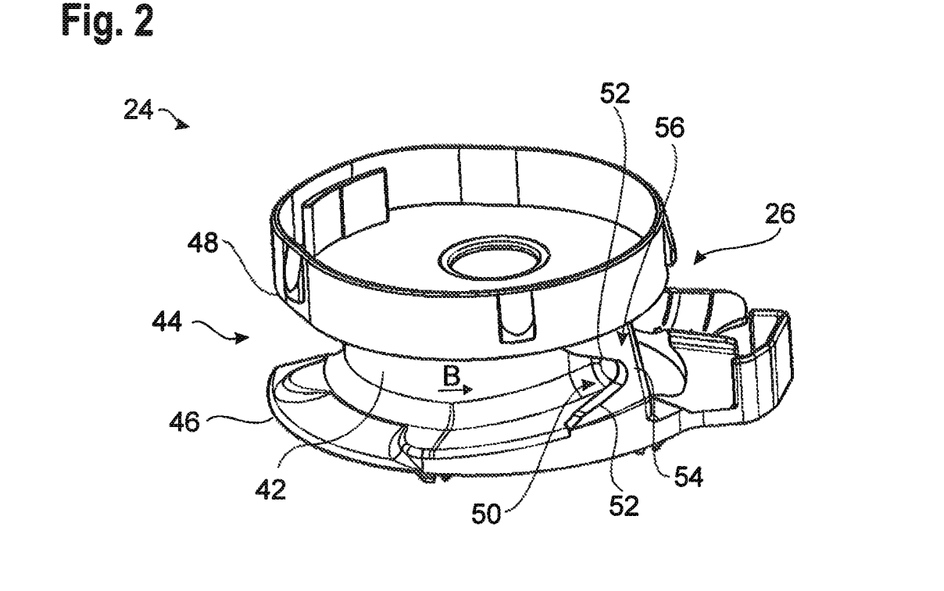
FIG. 2 shows a guiding component of the belt retractor according to the invention from FIG. 1 in a perspective view.

The radially inner circumferential wall 42 may extend especially over an angular area of about 200° to 270°. Thus, an opening is left in the radially inner circumferential wall 42 over about 90 to 160° in which the external toothing of the drive wheel 16 is exposed and thus is accessible from outside.

The radially inner circumferential wall 42 also defines a guiding groove 44 along with two portions 46, 48 of the guiding component 24 extending radially outwardly from the axial ends of the circumferential wall 42 and being circumferential in a closed manner. The guiding groove 44 helps to maintain the force transmission element 22 in the plane of the drive wheel 16.

Furthermore, at the guiding component 24 an energy-dissipating structure 50 is provided. The latter serves for reducing the kinetic energy of the force transmission element 22 and bring the latter to a halt when it contacts the energy-dissipating structure 50.

To this end, the energy-dissipating structure in this example includes two cutting edges 52 each of which extends diagonally so that they form a V opened against the direction of movement B of the force transmission element 22 (cf. arrow in FIG. 2). When viewed in the direction of movement B, the two cutting edges 52 are connected by a land 54 extending in parallel to a shaft of the drive wheel 16 and forming, together with the radially inner circumferential wall 42 and the upper and lower radially projecting portions 46, 48, a passage into which the front end 28 of the force transmission element 22 enters.

The direction of movement B of the force transmission element 22 coincides with the direction of rotation of the drive wheel 16 during belt tensioning.

The entire energy-dissipating structure 50 forms a radially outer circumferential wall 56 extending merely over a very small angular area, however. For example, the radially outer circumferential wall 56 covers about 10 to 45° along the outer circumference of the guiding component 24, with the cutting edges 52 being included.

With the exception of said radially outer circumferential wall 56, the guiding component 24 is substantially open over its outer circumference, especially in the area in which the force transmission element 22 moves from the open outlet end of the tensioner tube 20 to the energy-dissipating structure 50.

The energy-dissipating structure 50 in this example is arranged distant from the open outlet end of the tensioner tube 20 by an angle of about 235° to 345° to obtain a maximum travel path of the force transmission element 22.

The engaging area 26 also extends against the direction of movement B of the force transmission element 22 from the open outlet end of the tensioner tube 20 over a certain angular portion in which the external toothing of the drive wheel 16 is outwardly exposed, as the radially inner circumferential wall 42 is interrupted in said angular portion.

Upon activation of the belt tensioner 10, the gas generator 18 is ignited and the force transmission element 22 still being completely received within the tensioner tube 20 at this instant is accelerated. With high kinetic energy the force transmission element 22 leaves the tensioner tube at the open outlet end thereof and in the engaging area 26 impacts on the external toothing of the drive wheel 16. Here part of the kinetic energy of the force transmission element 22 is transmitted to the drive wheel 16 and thus to the belt reel 14 so that the drive wheel 16 is co-rotated with the belt reel 14.

Since the remainder of the force transmission element 22 is fed from behind in the direction of movement B, the front end 28 of the force transmission element 22 continues moving along the guiding groove 44 of the guiding component 24 away from the engaging area 26. This situation is shown in FIG. 5, while FIG. 4 illustrates the situation before the start of belt tensioning.

As soon as the front end 28 of the force transmission element 22 has reached the energy-dissipating structure 50, the cutting edges 52 dig themselves into the deformable material of the force transmission element 22 and in this way dissipate the kinetic energy thereof.

Also, the land 54 which in this area radially outwardly confines the guiding groove 44 helps to dissipate the kinetic energy of the force transmission element 22 and to decelerate and bring the latter to a halt. The front end 28 of the force transmission element 22 slides into the gap between the radially inner circumferential wall 42 and the radially outer circumferential wall 56 and, resp., the land 54, thus resulting in increased friction and hence in dissipation of kinetic energy.

Figure 7:
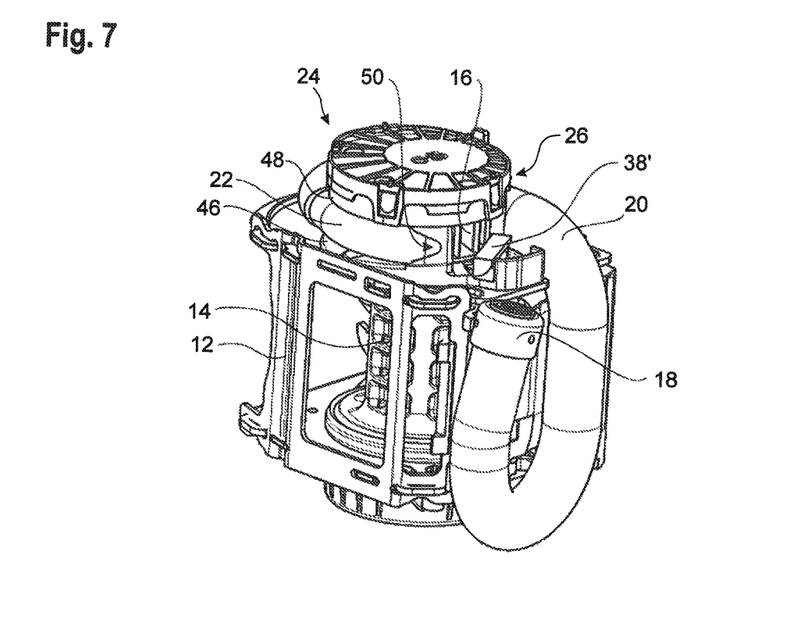
FIG. 7 shows a schematic perspective representation of the assembly from FIG. 3 after the force transmission element has left the tensioner tube.

The force transmission element 22 is completely brought to a halt shortly after its front end 28 has contacted the energy-dissipating structure 50. This situation is shown in FIGS. 6 and 7.

The radially inner circumferential wall 42 in this example ends directly behind the front end in the direction of movement B of the radially outer circumferential wall 56. The force transmission element 22 is brought to a halt and is held by the energy-dissipating structure 50, however.

The final segment 38 of the force transmission element 22, in this case subdivided by two constrictions 26, in this example disintegrates into four single parts 38' at the latest when passing the drive wheel 16. Said single parts 38' do not always pass the drive wheel 16 but may be left in the engaging area 26 when the force transmission element 22 comes to a halt. This is indicated in FIG. 7. As soon as force limitation starts, however, during which the drive wheel 16 is rotated against the direction of movement B, said single parts 38' are pushed out of the engaging area 26. Along with other possible fragments of the force transmission element 22 which were severed at the constrictions 36, said parts collect in an area of the retractor frame 12 distant from the drive wheel 16, where they cannot contact the drive wheel 16 again.

The energy-dissipating structure 50 is distant from the open outlet end of the tensioner tube 20 so far in the direction of movement B that the force transmission element has completely left the tensioner tube 20. Accordingly, it is possible that the final segment 38 already has disintegrated into its single parts 38'.

The belt tensioner 10 has been described here in connection with an elongate flexible force transmission element 22, but it would be easily possible to confer the concept according to the invention to a belt tensioner comprising a different force transmission element, e.g. a number of individual balls or a number of individual interconnected force transmission elements. It would be equally imaginable to realize the belt tensioner in the form of a belt buckle or end fittings tensioner instead of arranging it on a belt retractor.

The invention claimed is:

1. A belt tensioner (10) for a seatbelt system, comprising a tensioner tube (20) having an open outlet end and a force transmission element (22) which is guided within the tensioner tube (20) and which leaves the tensioner tube (20) through the open outlet end, a gas generator (18) providing compressed gas for displacing the force transmission element (22) within the tensioner tube (20) as well as a drive wheel (16) rotated by the force transmission element (22) leaving the tensioner tube (20), wherein a guiding component (24) surrounding the drive wheel (16) is provided into which the force transmission element (22) enters as soon as it leaves the tensioner tube (20), and at the guiding component (24) an energy-dissipating structure (50) is provided which the force transmission element (22) contacts when it has at least substantially completely left the tensioner tube (20), wherein the energy-dissipating structure (50) comprises at least one cutting edge (52) for engaging and digging into the force transmission element (22).

2. The belt tensioner according to claim 1, wherein the energy-dissipating structure (50) stops the force transmission element (22).

3. The belt tensioner according to claim 1, wherein the guiding component (24) includes a radially inner circumferential wall (42) which extends over a major part of the periphery of the drive wheel (16) and which surrounds the drive wheel (16).

4. The belt tensioner according to claim 1, wherein the force transmission element (22) is an elongate flexible elastically and/or plastically deformable plastic component.

5. The belt tensioner according to claim 1, wherein the energy-dissipating structure (50) is arranged, when viewed in the direction of rotation (B) of the drive wheel, distant from the open outlet end of the tensioner tube (20) by an angle of about 245°-280°.

6. The belt tensioner according to claim 1, wherein the energy-dissipating structure (50) is formed at a radially outer circumferential wall (56) of the guiding component (24) which only extends over small part of the outer periphery of the guiding component (24).

7. The belt tensioner according to claim 1, wherein the energy-dissipating structure (50) comprises two cutting edges (52) arranged in a V-shape, an opening of the V-shape defined by the cutting edges (52) being against the direction of movement (B) of the force transmission element (22).

8. The belt tensioner according to claim 1, wherein the energy-dissipating structure (50) comprises two cutting edges (52) and a land (54), the land (54) extending in parallel to a shaft of the drive wheel (16) and connecting the two cutting edges (52).

9. The belt tensioner according to claim 1, wherein the guiding component (24) is open in portions along its outer periphery.

10. The belt tensioner according to claim 3, wherein the radially inner circumferential wall (42) extends about 145° over the periphery of the drive wheel (16).

11. The belt tensioner according to claim 6, wherein the radially outer circumferential wall (56) only extends about 24° over the outer periphery of the guiding component (24).

* * * * *